(12) United States Patent
Craciunas et al.

(10) Patent No.: US 10,205,607 B2
(45) Date of Patent: Feb. 12, 2019

(54) ONLINE INCREMENTAL SCHEDULING METHOD FOR DETERMINISTIC NETWORKS

(71) Applicant: FTS Computertechnik GmbH, Vienna (AT)

(72) Inventors: Silviu Craciunas, Vienna (AT); Ramon Serna Oliver, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 359 days.

(21) Appl. No.: 15/256,804

(22) Filed: Sep. 6, 2016

(65) Prior Publication Data

US 2017/0070439 A1    Mar. 9, 2017

(30) Foreign Application Priority Data

Sep. 7, 2015    (AT) .............................. A 50768/2015

(51) Int. Cl.
  *G06F 15/16* (2006.01)
  *H04L 12/413* (2006.01)

(52) U.S. Cl.
  CPC ................................ *H04L 12/413* (2013.01)

(58) Field of Classification Search
  CPC ........................... H04L 12/413; H04L 12/28
  USPC ...................................................... 709/204
  See application file for complete search history.

(56) References Cited

U.S. PATENT DOCUMENTS

| | | | |
|---|---|---|---|
| 2002/0163932 A1* | 11/2002 | Fischer ................. | H04L 1/0003 370/465 |
| 2006/0083266 A1* | 4/2006 | Lim ........................ | H04L 69/24 370/503 |
| 2008/0080562 A1* | 4/2008 | Burch ................... | H04J 3/0667 370/503 |
| 2008/0243950 A1* | 10/2008 | Webman ................. | G06F 11/14 |
| 2013/0145049 A1* | 6/2013 | Stanton ..................... | G06F 1/14 709/248 |
| 2015/0078399 A1* | 3/2015 | Poledna ................ | H04J 3/0655 370/419 |

* cited by examiner

*Primary Examiner* — Tauqir Hussain
(74) *Attorney, Agent, or Firm* — Eversheds Sutherland (US) LLP (57) ABSTRACT

A method for transmitting messages in a computer network, e.g., a TTEthernet network, the network including nodes and at least one star coupler, which are connected in a multi-hop fashion, the nodes periodically exchanging time-triggered (TT) messages according to a pre-defined transmission schedule, and wherein nodes exchange, according to the schedule, messages via scheduled time-triggered flows, wherein adding a new time-triggered flow into the running computer network includes: 1. determining, for each hop in the new flow path of the new time-triggered flow, a free transmission gap in the transmission cycle of the corresponding port, 2. modifying, if a sufficiently long transmission gap is not free in a transmission cycle, said transmission cycle, wherein 3. modifying transmission cycles occurs iteratively, and 4. if a sufficient transmission gap is found in each transmission cycle along the flow path, the new transmission is incorporated into each of the cycles and executed periodically.

18 Claims, 4 Drawing Sheets

ONLINE INCREMENTAL SCHEDULING METHOD FOR DETERMINISTIC NETWORKS

CROSS-REFERENCE TO RELATED APPLICATIONS

This application claims priority to Austrian Patent Application A 50768/2015, filed Sep. 7, 2015, which is incorporated herein by reference.

SUMMARY OF THE INVENTION

The invention relates to a method for transmitting messages in a computer network, for example a TTEthernet computer network, wherein
  said computer network comprises nodes and at least one star coupler, which nodes and said at least one star coupler are connected in a multi-hop fashion,
  wherein nodes in said computer network periodically exchange time-triggered (TT) messages according to a pre-defined transmission schedule, and wherein
  nodes exchange, according to said transmission schedule, messages via scheduled time-triggered flows, wherein a time-triggered flow specifies at least the following information:
    sender node and a set of at least one destination node;
    at least one multi-hop path between said sender node and the at least one destination node;
    message size;
    message period;
  wherein the transmission of messages at each hop is driven by the transmission schedule executed cyclically, and wherein the transmission schedule is decomposed into sub-schedules for each transmitting port of each network component, i.e. for each transmitting port of each node and for each transmitting port of the at least one star coupler, wherein each sub-schedule is executed locally by the corresponding network component, in particular following a global notion of time, according to a transmission cycle, wherein each transmission cycle has a duration which is a multiple of the period time of all transmitted flows by the port of the network component, and wherein the transmission cycle of each hop in the flow path is chosen such that a scheduled interval, the so-called "transmission window", for the transmission of each flow is guaranteed, and wherein the length (duration) of the transmission window is sufficient to account for the transmission time of the message, and wherein the transmission windows for a given flow along the flow path are sequenced in time such that the transmission of said flow on a given port is scheduled after the transmission of the previous port, and wherein transmission windows of different flows do not overlap in time on a given transmission port.

Furthermore, the invention relates to a computer network, for example TTEthernet computer network, wherein
  said computer network comprises nodes and at least one star coupler, which nodes and said at least one star coupler are connected in a multi-hop fashion,
  wherein nodes in said computer network periodically exchange time-triggered (TT) messages according to a pre-defined transmission schedule, and wherein
  nodes exchange, according to said transmission schedule, messages via scheduled time-triggered flows, wherein a time-triggered flow specifies at least the following information:
    sender node and a set of at least one destination node;
    at least one multi-hop path between said sender node and the at least one destination node;
    message size;
    message period;
  wherein the transmission of messages at each hop is driven by the transmission schedule executed cyclically;
    and wherein the transmission schedule is decomposed into sub-schedules for each transmitting port of each network component, i.e. for each transmitting port of each node and for each transmitting port of the at least one star coupler, wherein each sub-schedule is executed locally by the corresponding network component according to a transmission cycle, wherein each transmission cycle has a duration which is a multiple of the period time of all transmitted flows by the port of the network component, and wherein the transmission cycle of each hop in the flow path is chosen such that a scheduled interval, the so-called "transmission window", for the transmission of each flow is guaranteed, and wherein the length (duration) of the transmission window is sufficient to account for the transmission time of the message, and wherein the transmission windows for a given flow along the flow path are sequenced in time such that the transmission of said flow on a given port is scheduled after the transmission of the previous port, and wherein transmission windows of different flows do not overlap in time on a given transmission port.

In particular, the transmission schedule is statically defined, e.g. it is calculated once and then repeats cyclically without changes.

A "transmission cycle" relates to the transmission sub-schedule of one particular port of a network device, which cycle after being completed repeats over again.

A computer network, for instance according to IEEE 802.3 Ethernet [2], can carry both scheduled and unscheduled communication messages, whereby scheduled communication messages are transmitted from a sending entity (sending node) to one or more receiving entities (receiving nodes) at predefined points in a network-wide well-defined time, for example a global time, while unscheduled communication messages are transmitted according to other criteria. Appropriate transmission protocols and mechanisms for message handling and message prioritization can be applied, whereby it is ensured that no interference of any scheduled or unscheduled communication message with any given scheduled communication message can occur.

Typically a global transmission schedule approach, whereby the transmission of scheduled messages follows a predefined global schedule ("transmission schedule") calculated offline (i.e. prior to initiating the transmission of messages), is chosen because the creation of transmission schedules for nontrivial communication networks is a mathematically complex task and requires significant computational resources.

For very large or dynamic networks, the global schedule approach may not be feasible, specifically if there are requirements for the dynamic addition of new scheduled messages—e.g. while other transmissions are already ongoing.

It may be a task of the invention to describe a method to transmit new scheduled messages in a time-triggered computer network, in which network time triggered messages ("old" messages) are already being transmitted according to a pre-defined transmission schedule.

Furthermore, it may be a task of the invention to describe such a method, wherein the real-time properties of the existing ("old") scheduled messages are preserved and the real-time properties of the new scheduled messages are guaranteed.

These tasks can be achieved with a method described above, wherein according to the invention for adding a new time-triggered flow into the computer network, in particular into the running computer network, the following steps are carried out:

1. determining, for each hop in the new flow path of the new time-triggered flow, a free transmission gap in the transmission cycle of the corresponding port, wherein the transmission gap has to be sufficiently long to place a transmission window for the new flow, in particular following the right sequence in time along the path;
2. modifying, in case that a sufficiently long transmission gap is not free in a transmission cycle, said transmission cycle, preferably by modifying, in particular shifting, at least one existing transmission in said transmission cycle, wherein
3. modifying transmission cycles takes place iteratively, wherein
    (a) initially, only transmission cycles being affected by the addition of the new flow, i.e. transmission cycles being part of the flow path, are considered for modification;
    (b) one or more transmission windows for existing (old) flows with known predecessor and/or successor transmission windows are shifted, in particular until a sufficiently large transmission gap is available in the transmission cycle or all shifting possibilities have been exhausted;
    (c) if for a given transmission cycle, the previous steps 3 (a) and 3 (b) do not render a sufficiently large transmission gap in the transmission cycle to place the transmission window of the new flow, the set of known transmission cycles being considered for modification is extended;
    (d) steps (b) and (c) being repeated until a sufficient gap is found, the cumulated knowledge is equal to the entire network, or a limiting factor has been reached (e.g. a predefined time out),
4. if a sufficient transmission gap is found in each transmission cycle along the flow path, the new transmission is incorporated into each of the transmission cycles and is executed periodically.

The formulation "transmissions . . . considered" in step 3 (a) means, that these cycles, which according to step 3 (a) have dependencies contained within this set of cycles, can be modified. Transmission windows of other flows that intersect with the new flow may not be modified since the dependencies (previous transmission windows) are not known.

The set of "known" transmission cycles are those cycles that are considered. In particular, this means that initially, a set K of transmission cycles contains all transmission cycles being affected by the addition of the new flow, i.e. transmission cycles being part of the flow path, only transmission windows for existing (old) flows, which predecessor and/or successor transmission windows are in a transmission cycle in the set K can be shifted, and if for a given transmission cycle, the previous steps do not render a sufficiently large transmission gap in the transmission cycle to place the transmission window of the new flow, the set K is extended.

Shifting a transmission window in this context refers to moving the window in the transmission cycle, in particular advancing or delaying the start of the window by an amount of time.

Furthermore, these tasks can be achieved with an above mentioned computer network, which network, for adding a new time-triggered flow into the computer network, in particular into the running computer network, comprises means, or is connected to means, or can be connected to means, which means are adapted to carry out the above mentioned steps 1.-4.

Advantageous embodiments of the method as well as of the network according to the invention are described in the following. These further embodiments may be realized in any arbitrary combination:

*)—Step 2 can be carried out with the following restriction(s):
  (a) an existing transmission window can be shifted, in particular advanced or delayed, within this transmission cycle within the limits imposed by the end of the predecessor transmission window and the beginning successor transmission window(s) in the respective transmission cycles, preferably plus the additional transmission latency added by a transmission media; and/or
  (b) the transmission windows of the first and last hops cannot be shifted.

The "first" and "last" hop refers to the transmission window of the sender node (first port) and that of the last node before the receiver node (last port/ports). In essence, these are the end points defining the original transmission and reception times for the message. Changing them would mean altering the message properties (either by sending or receiving before or later). Anything in between (the intermediate hops) can be changed without the end sides (sender and receivers) noticing any difference (they will keep sending and receiving at exactly the same point In time).

*) According to step 3 (b) it can further be provided that:
  (i) if the preceding transmission window of the transmission window in question is known, said transmission window in question can be advanced at most until the end of the predecessor transmission window;
  (ii) if the succeeding transmission window(s) is (are) known, a transmission window in question can be delayed at most until the beginning of that succeeding window or, in the case of two or more succeeding transmission windows, until the beginning of the earliest succeeding transmission window.

*) In step 3 (c) it can be provided that
  (i) the extension is limited to a defined subset of all remaining transmission cycles in the network, for example those transmission cycles at one hop distance; and/or
  (ii) the extension may be directed to a defined subset of remaining nodes in the network, for example those containing predecessor or successor transmission windows of scheduled flows in the given transmission cycle.

*) It can be of advantage that the length (duration) of a transmission window is sufficient to account for the transmission time of the flow, that is the time necessary to transfer the bits of the message of that flow, as well as additional jitter, e.g. due to the time synchronization precision.

\*) It can be of advantage that the duration of a transmission cycle is the least common multiple (LCM) of all flows in the network.

\*) It can be of advantage when a flow further specifies the maximum amount of data transmitted at each period interval and/or an end-to-end maximum latency.

\*) It can be of advantage when the steps for adding a new time-triggered flow into the computer network, in particular into the running computer network, are carried out during run-time of the network.

\*) For example, the steps for adding a new time-triggered flow are carried out by the following means:

(i) an external component, e.g. a component which is not part of the computer network; or (ii) one component of the computer network, e.g. a specific node; or (iii) a subset of the nodes and/or starcouplers of the network or of all of the nodes and starcouplers of the network.

Option (i) implies a central computer acting as a "brain", having the knowledge of the network configuration but not being part of it.

Option (ii) is similar to (i) just that since it is part of the network it can propagate the results to the network on its own. Also, due to being part of the network it does not need to "store locally" all the information as it can acquire it on demand (e.g. instead of having the complete knowledge of the network configuration it may "ask" for the pieces it needs at any time).

Option (iii) means that any component (for example, all starcouplers, or a subset of them) is able to calculate new schedules and distribute it to through the network. This allows a distributed solution with no "central brain". A simple example would be that the new schedule is calculated by the sender node of the new flow, or the first starcoupler on the flow path. Here is where the "not having the entire knowledge of the network configuration" really makes a difference, since none of the devices/components in the network would need to have the capacity to store that information.

The invention relates to a method and a network for the transmission of new dynamically scheduled messages in a time-controlled computer network, e.g. TTEthernet [5], wherein the network consists of a number nodes connected to each other by means of one or more star couplers, and said nodes communicate via scheduled time-triggered messages based on a global time notion, e.g. SAE AS6802 [1].

The real-time properties of the existing scheduled messages can be preserved and the real-time properties of the new scheduled messages are guaranteed.

The preservation of real-time properties refers to the guaranteed end-to-end latency for the periodic transmission of messages between one sender node and one or several receiver nodes. The end-to-end latency is bounded if the transmission methods ensure that the messages are transmitted at their scheduled point in time (within a small deviation derived from the clock synchronization imprecision) without occurring in contention with other scheduled or unscheduled transmissions.

The proposed method relates to dynamically scheduled transmissions, whereby the transmission of new messages is scheduled preserving the transmissions of already scheduled messages. The proposed method enables the addition of new transmissions.

The computer network comprises nodes and at least one star coupler, and the nodes are connected to each other in a multi-hop fashion by means of the star coupler(s). Each node is connected to, at least, one star coupler, in particular via a physical link (communication line). For example, the connection is done via physical ports on each of the devices. Nodes and star couplers have a limited number of ports, and therefore a maximum number of connecting physical links.

All nodes and star couplers share a common notion of time by means of e.g. a time synchronization protocol like, for example, SAE AS6802 [1] or IEEE 802.1AS [3].

Nodes communicate to each other in a time-controlled manner by exchanging periodic time-triggered messages. Time-triggered messages can be defined by the concept of time-triggered flows, like for example virtual links (VL) defined in [6]. A virtual link is a logical communication channel between one sender and one or several receivers.

A time-triggered message, characterized by a time triggered flow (flow), may have the following attributes:

a sender node one or several receiver nodes a multi-cast path between the sender and receivers a period a maximum message size a maximum end-to-end latency The transmission of time-triggered messages, characterized by e.g. VLs, follows a schedule. Each flow is routed through the network. The routing process consists of finding a multi-hop network path connecting the sender node with each of the receivers (using, for example Steiner Trees [4]).

The message is propagated periodically from the sender to the receiver nodes, in particular via scheduled frames, at each of the intermediate communication lines constituting the network path. Therefore, for each physical link on the network path, a transmission window is scheduled for periodic transmission according to the respective message attributes. Transmission windows are scheduled sequentially such that the transmission point in time of any intermediate hop (port) is not scheduled before the precedent transmission window (e.g. that on the preceding hop (port)).

The beginning of the transmission window is the schedule point in time, defined as an offset relative to the period, in which the respective frame or frames carrying the message will be transmitted. The transmissions are repeated periodically at the given offset.

The end-to-end latency is guaranteed if the last frames are received at the receiver nodes within the maximum end-to-end latency relative to the transmission of the first frame by the sender node within the current period.

During operation, nodes and star couplers start the transmission of flows on ports at their scheduled points in time (within a given time precision) following the schedule for the respective port (referred as transmission cycle). The transmission cycle comprises the scheduled points in time for all flows scheduled on that port. The schedule repeats cyclically according to the network cycle, typically the least common multiple of the periods of all flows.

The generation of a network schedule comprising the periodic transmission of frames for all flows satisfying their end-to-end latency and without contention is a complex operation. Therefore, it is typically calculated and distributed offline and static during operation (e.g. does not change dynamically).

Given a time-controlled computer network as described above in operation, the invention relates to a method to add transmitted time-triggered flows (characterized by e.g. new VLs), wherein the transmission points in time of the respective frames are scheduled without altering the real-time properties (in particular the end-to-end latency, and/or sending time, and/or receiving time) of the already scheduled time-triggered flows and the real-time properties of said new flows are guaranteed.

The invention also relates to a method for the transmission of time-triggered flows, characterized by e.g. a VL, wherein the transmission windows and transmission points in time for the respective flows are scheduled without producing any modification to the transmission windows of any already scheduled transmission maintaining the real-time properties (in particular the end-to-end latency, and/or sending time, and/or receiving time) of other transmissions, and guaranteeing the real-time properties of said new flows.

The invention also relates to a method for the transmission of time-triggered flows, characterized by e.g. a VL, wherein the transmission windows and the transmission points in time for the respective flow are scheduled introducing modifications to the transmission windows of other already scheduled transmissions, maintaining the end-to-end real-time properties of the existing transmitted flows, and the real-time properties (in particular the end-to-end latency, sending time, and/or receiving time) of said new flows is guaranteed.

The invention also relates to a method for the transmission of messages, characterized by e.g. a VL, wherein the transmission windows and the transmission points in time for the respective flow are scheduled introducing modifications to the transmission windows of other already scheduled transmissions, and the amount of transmission cycles for which transmission changes may be required is variable and less than the complete set of transmission cycles in the network.

The invention also relates to a method for the transmission of messages, characterized by e.g. a VL, and the dynamic calculation of the transmission windows and transmission points in time for the respective flow, wherein the amount of nodes and star couplers for which information about their transmission cycles is required is variable and less than the complete set of transmission cycles of all nodes and star couplers in the network.

BRIEF DESCRIPTION OF THE DRAWINGS

The specific features and advantages of the present invention will be better understood through the following description. In the following, the present invention is described in more detail, in particular with reference to exemplary embodiments (which are not to be construed as limitative) depicted in drawings.

DETAILED DESCRIPTION

Figure 1:
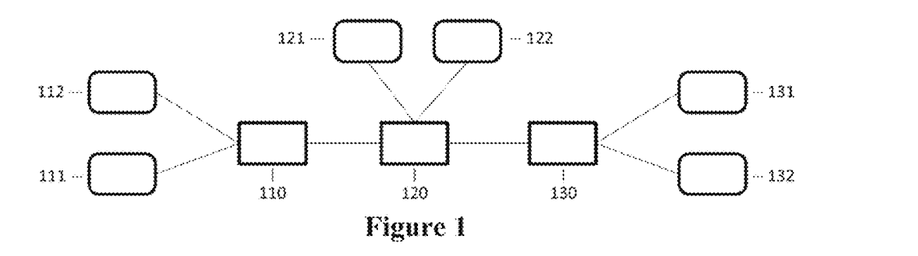
FIG. 1 shows an example of a time-controlled computer network.

FIG. 1 shows an example of a time-controlled computer network comprising three time-controlled star couplers (for example, switches) 110, 120, and 130, and six nodes (for example, end systems) 111, 112, 121, 122, 131, 132. All components are connected via bidirectional lines as shown in FIG. 1 and have a common time-base, for example as defined in TTEthernet [1]. Time-triggered (TT) messages are transmitted following a pre-configured global cyclic schedule ("transmission schedule"). TT messages can be transmitted in coexistence with other traffic (best effort).

Such a global distributed schedule determines exact points in time for the transmission of messages between the network components, in a way that the transmissions through the shared lines is realized without contention/conflict. The calculation of the schedule is computationally intense, and therefore it is typically performed offline (i.e. prior to the network start-up) and distributed fully or partially to each of the components. At run-time, the global time base, within a known precision, is available to all components, and used to execute the transmission schedule in a cyclic and coordinated manner.

Non-scheduled traffic can be transmitted during the sparse time between scheduled transmissions, in a way that the interference to scheduled transmissions is either avoided or bounded to a known maximum delay.

The transmission of scheduled messages is logically organized according to the concept of flows, in particular time-triggered flows ("TT-flows"). A flow, in particular a TT-flow relates to one sender node (e.g. end system) and one or multiple receivers (receiving nodes), as well as a physical path (communication lines) between them and an amount of information to be transmitted (message size) as well as the periodicity of the communication (period). The message is propagated periodically from the sender to the receiver nodes, in particular via scheduled frames, at each of the intermediate communication links constituting the network path.

The transmission of frames is specified by means of a transmission window within a transmission cycle. A transmission window starts with the transmission event (point in time) and has a duration, at least, sufficient to transmit the number of frames necessary to transport the message. Optionally, the transmission window may be enlarged to account for the time synchronization inaccuracy between nodes (precision), or additional delays involved in the communication.

In TTEthernet, TT-Flows follow the definition of Virtual Links (VL) provided in [6], with the peculiarity of defining a message size that fully fits in the payload of one Ethernet frame. The transmission of messages in a VL originates at the sender and propagates through the physical path until each receiving node is reached. Each of these propagation steps implies a scheduled frame transmission after the reception of the previous frame. Additional constraints may be provided for VLs, for example a maximum end-to-end transmission deadline, referring to the maximum allowed interval for the propagation of frames from sender to receiver(s).

Let $vl_a$ be a virtual link with sender node 121 and receiver node 131 in the network depicted in FIG. 1. The network path is hence composed by the sequence {121, 120, 130, 131}, as extracted from FIG. 1. Let the period as well as the end-to-end deadline of $vl_a$ be 100 ms.

Figure 2:
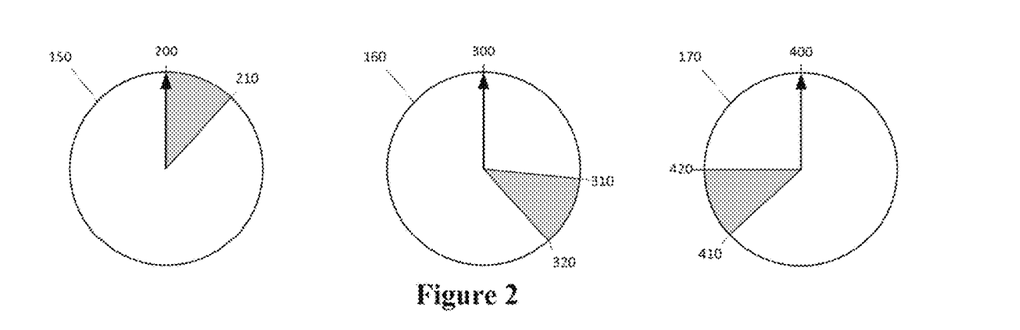
FIG. 2 shows the scheduled transmission of a flow with the corresponding transmission cycles of the nodes constituting its network path.

FIG. 2 illustrates the periodic transmission of frames originated by $vl_a$ within the transmission cycles 150, 160, 170 of the three nodes conforming the respective network path. Note that in this example only the transmission events are scheduled, hence node 131, the receiver, does not appear in FIG. 2. Respectively, reference sign 150 represents the cyclic transmission of frames from $vl_a$ in node 121, reference sign 160 that in node 120, and reference sign 170 in node 130. Each of the transmission cycles represents a cycle duration of 100 ms starting from the top most point in time (200, 300, and 400) and progressing clockwise. Preferably, the clock is synchronized globally at every cycle; hence the time progression is homologous for all systems, within a known synchronization precision.

In essence, at the point in time 200 a transmission event for a message of $vl_a$ occurs at node 121 which initiates the transmission of a frame taking place until time 210. Node 120 receives the frame and transmits a succeeding frame at time 310, being the transmission finished by, at most, 320. Similarly, node 130 transmits a succeeding frame at 410, finishing by 420. This transmission cycle repeats endlessly in a coordinated manner.

Note that event 310 can only occur after event 210, as the frame transmission in node 120 directly depends on the previous reception of the frame transmitted by node 121. Analogously, event 410 depends on the occurrence of event 320. In essence, for the second and following frames propagated along the network path of a VL, the transmission can only be initiated after the previous frame of the VL has arrived at the current node.

Figure 3:
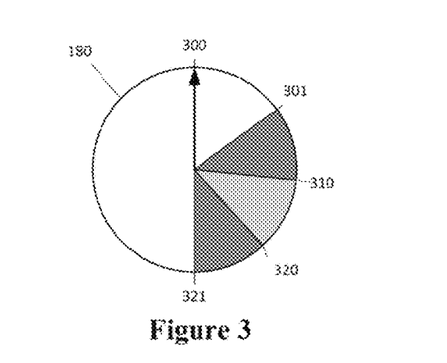
FIG. 3 shows a detailed representation of the transmission cycle depicted in FIG. 2.

FIG. 3 provides a detailed representation 180 of the transmission cycle depicted in FIG. 2 including other scheduled transmissions in the same communication line for node 120 (dark gray), in addition to those of $vl_a$ (light gray) already depicted in FIG. 2. We observe that additional transmissions can be guaranteed between the transmission windows 301-310 and 320-321. Note that a transmission cycle defines the outgoing transmissions of one single communication line of the respective node (often referred as ports). Therefore, representation 180 depicts only the transmission cycle of node 120 for the communication line between nodes 120 and 130. Also note that similarly to the sequential transmissions depicted in FIG. 2, the transmissions of frames shown in FIG. 3 have dependencies to previous transmissions from nodes 121, 122 or 110 as part of VL paths traversing node 120.

Assume that once the network is operational and the transmission cycle of each node is continuously being executed in a time-controlled manner, a new VL, $vl_b$, for example with source node 112 and destination (receiver node) 132 is required. Such scenario may arise when, for example, a new node is plugged into one of the existing star couplers and requests a new deterministic route through the network. Similarly, it may occur if a new application starts execution in one of the existing nodes, and such application requests a new deterministic communication route through the network.

Let the period as well as end-to-end deadline of the newly requested $vl_b$ be 50 ms. Note that this implies that two instances of $vl_b$ will fit within one cycle of 100 ms, resulting in that two transmissions, one in the first half of the cycle and one in the second half, need to be scheduled.

The communication path of $vl_b$, {112, 110, 120, 130, 132}, traverses star coupler 120 through the same line as $vl_a$. Therefore, the transmission of messages from $vl_b$ requires modifications to the transmission cycles of the respective nodes in order to schedule the necessary frame transmissions within the respective cycles. This reduces to finding unused intervals along the cycles comprising the communication path large enough to transmit the respective frames respecting the logical order and message propagation dependencies.

Figure 4:
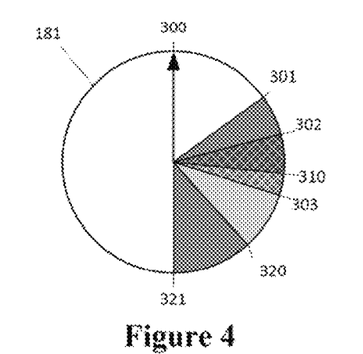
FIG. 4 shows the transmission schedule of FIG. 3 with a new time-triggered message to be transmitted.

Assume that, due to the sequential propagation of the message along the path, and in particular, the dependencies with the preceding transmission windows, the transmission due in the star coupler 120 can only initiate after the point in time 302, depicted in FIG. 4. Note however, that the transmission window 302-303 overlaps with the previous communications, as depicted in the cycle superposition 181. In fact, it is not possible to find a free interval to schedule the new frame within the first half of the 100 ms cycle, which renders the end-to-end communication deadline of 50 ms unfeasible.

Without additional knowledge of the dependencies towards previous and following transmissions, the existing pre-configured transmission schedule cannot be modified. In essence, any change on the transmission cycle would potentially result in a misalignment with the dependent cycles of the neighbor hops and therefore, the loss of determinism in the global communication. Considering the complete network configuration with the dependent communications of all nodes and star couplers would allow a smart realignment of transmissions leading to a valid solution, if one exists. However, this implies a potentially large amount of information to be handled, which may result impractical for large network configurations with, for example, hundreds or thousands of nodes and star couplers.

The modification of existing transmission cycles, therefore, requires certain knowledge of the dependent transmissions and the propagation effects of any modification performed on the transmission cycles of other hops. For instance, delaying one transmission in the current cycle of any intermediate hop may imply readjusting the dependent transmission of the following hop such that the subsequent transmission is also delayed if needed, solving any possible misalignment due to the introduced delay. This may potentially propagate the delay recursively until the end node receiving the message of the respective VL, but it may also propagate to transmissions of messages from other VLs being shuffled to avoid contention due to the modifications in the transmission cycles. Essentially, this kind of adjustments may originate a cascade effect affecting the entire network configuration.

EXAMPLE 1

To circumvent this effect, the present invention introduces a novel method comprising an iterative process, in which advantageously any transmission cycle is only modified if the dependencies of the target transmission are known. The initial information required is reduced to the transmission cycle of the hop where the new transmission is being added. If no interval is available for the new transmission, the knowledge is extended with the transmission cycles of immediate neighbor hops. This allows transmissions in the current cycle to be shuffled between the limits imposed by the directly dependent transmissions (i.e. previous and following hops).

Figure 5:
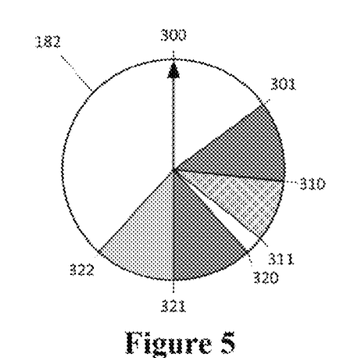
FIG. 5 shows the result of reorganizing the transmission schedule shown in FIG. 4 according to the invention, and FIGS. 6-9 a further example for an implementation of the method according to the invention.

Representation 182 in FIG. 5 depicts the result of reorganizing the transmission schedule shown in 181, now with the additional information of the transmission cycles of neighbor hops. As shown in FIG. 5, the transmission according to $vl_a$ scheduled previously in the time interval 310-320 in node 120 (see FIG. 4) is now relocated to an interval 321-322. This change is possible since the following transmission occurs in the neighbor hop 130 at point 410 (see FIG. 2), and point in time 410 is after the point in time 322, hence allowing shuffling the transmission without affecting the real-time properties (in particular the end-to-end latency, sending time, and/or receiving time) of the respective time-triggered message.

If shuffling transmissions of an existing transmission cycles considering the direct neighbors does not render sufficient gap to accommodate the new transmission window, further adjustments are sought by extending the information relative to the transmission cycles to, for example, the transmission cycles to one additional hop, and modifying the neighbor transmissions recursively in a similar fashion, hence resulting in an iterative process. In essence, the transmission cycles of nodes and star couplers with dependent transmissions are modified, preserving the real-time properties of existing messages, such that new transmissions can be allocated and their real-time properties guaranteed.

This approach allows for two dimensions of control towards the propagation of changes with a direct impact on the required amount of knowledge (information of transmission cycles) as well as the computation efforts. On one hand, the extension of the information regarding the transmission cycles of neighbor nodes can be limited, for each iteration, to a subset of all possible. This may result in some transmissions being not modifiable in the current cycle due to the lack of information of the respective dependencies. On the other hand, the number of iterations, and hence the propagation of changes to further nodes and their respective cycles can also be limited, hence concentrating changes locally. These two levels of control allow the introduction of new scheduled transmission in large networks, like e.g. the Internet, in which considering a complete knowledge of the entire network configuration is unfeasible, as well as nodes to alter—if needed—the transmission schedule of their close neighbors based on a cluster organization. In this way, it is possible to realize these actions within embedded devices with limited computing and processing resources (for example, within the network starcouplers) acquiring the distributed information regarding transmission cycles of neighbor hops as needed ("on the fly"), for instance by running dedicated network discovery and transport protocols.

EXAMPLE 2

Let $F_{500}$ be a time-triggered flow with sender node 112 and receiver node 131 in the network depicted in FIG. 1. The network path is hence composed by the sequence {112, 110, 120, 130, 131}, as extracted from FIG. 1. Let the period as well as the end-to-end delay specified for $F_{500}$ be 100 ms.

Figure 6:
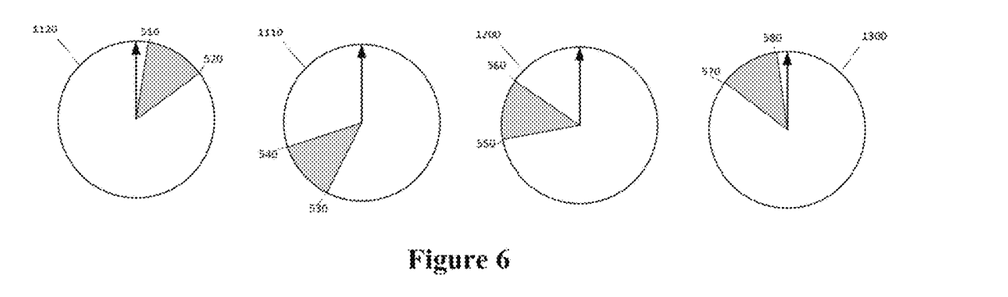

FIG. 6 shows the transmission cycles corresponding to the ports (communication lines) of each of the nodes in the network path. Respectively, 1120 depicts the transmission cycle in node 112, 1110 the cycle of node 110, 1200 depicts the cycle of node 120 and 1300 the cycle of node 130.

The transmission windows for the respective frames of $F_{500}$ scheduled on each cycle are depicted respectively as the gray areas between 510-520, 530-540, 550-560 and 570-580. All transmission cycles depicted represent a time interval of 100 ms.

The depicted transmission cycles enable the periodic transmission of $F_{500}$ within the defined end-to-end delay (deadline).

Assume once the system is operational and the transmission cycle of each node is continuously being executed in a time-controlled manner, a new time-triggered flow, $F_{600}$, with source node 121 and destination 131 is required. The network path for $F_{600}$ is hence composed by the sequence {121, 120, 130, 131}, as extracted from FIG. 1, hence intersecting with the path of $F_{500}$ in the starcouplers 120 and 130. Let the period as well as the end-to-end delay of $F_{600}$ be 50 ms. Note that the period and end-to-end latency of $F_{600}$ are half of the period and end-to-end latency of $F_{500}$, and therefore, two instances of $F_{600}$ shall be scheduled in the current transmission cycles with length 100 ms.

Figure 7:
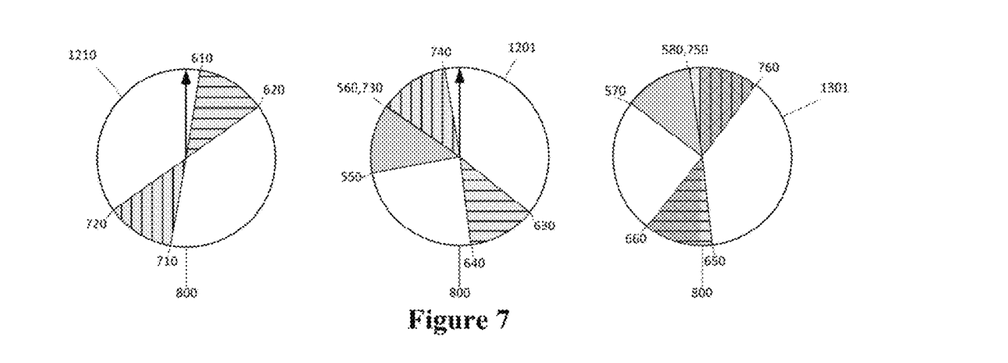

FIG. 7 depicts the initial attempt of allocating $F_{600}$ within the transmission cycles of the respective ports. Note the two instances before and after the middle point 800 of the respective cycles illustrated with horizontal and vertical pattern filling, respectively. The transmission cycle of node 121 is depicted in 1210, while 1201 and 1301 are updated versions of 1200 and 1300 introduced in FIG. 6.

Note that the second instance (after point 800) in cycle 1201 cannot be placed earlier than 730-740, as the transmission 550-560 of $F_{500}$ is present. Looking at 1201 it is clear already that the end-to-end deadline cannot be satisfied for $F_{600}$, as the remaining gap is not sufficient to schedule the following transmission. As a result, in 1301 the transmissions 750-760, as well as its homologous 650-660, are clearly exceeding the end-to-end limit of 50 ms.

To find a valid placement for $F_{600}$, we use the method described in this invention to apply suitable modifications to the transmission cycles in order to correctly allocate the transmission windows.

The initial set K of transmission cycles corresponding to those directly affected by the new transmission $F_{600}$ is considered as K={1210, 1200, 1300}.

It is clear from the previous attempt that windows 570-580 and its predecessor 550-560 make it impossible to allocate the new window within the expected time. Window 570-580 has dependencies towards window 550-560, however, both are scheduled almost "back-to-back", and therefore, shifting the window does not render a sufficiently large gap.

Window 560-550 cannot be modified, since the dependent transmission is within a cycle not contained in K.

In this case, we proceed to extend the set, to contain the cycles of neighbor nodes. In particular, K is extended to K={1210, 1200, 1300, 1110}. Now the dependent window 540-530 is found within the known cycles. However, once again, the two dependent transmissions (540-530 and 550-560) are scheduled tightly to each other, and no combination of shifting renders a sufficiently large gap.

Figure 8:
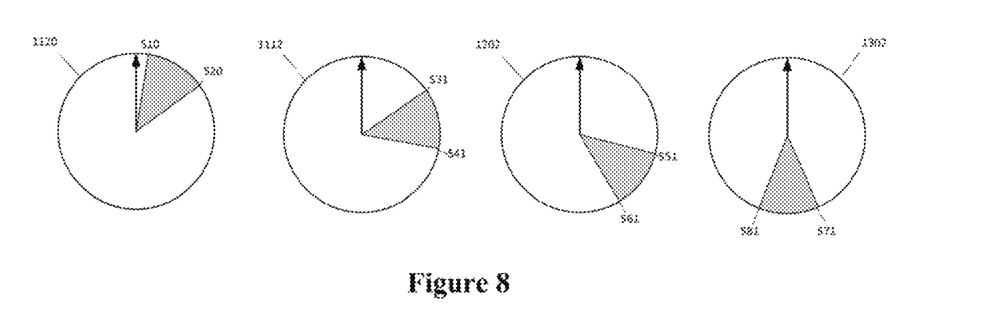

In yet a new iteration, K is extended to K={1210, 1200, 1300, 1110, 1120}. Now we observe that the dependent window of 530-540, which is 510-520, is scheduled with a large gap. This allows 530-540 to be shifted to a new position, depicted in FIG. 8 as 531-541. This shift allows window 550-560 to be equally shifted to 551-561, and ultimately, window 570-580 to be shifted to 571-581.

Figure 9:
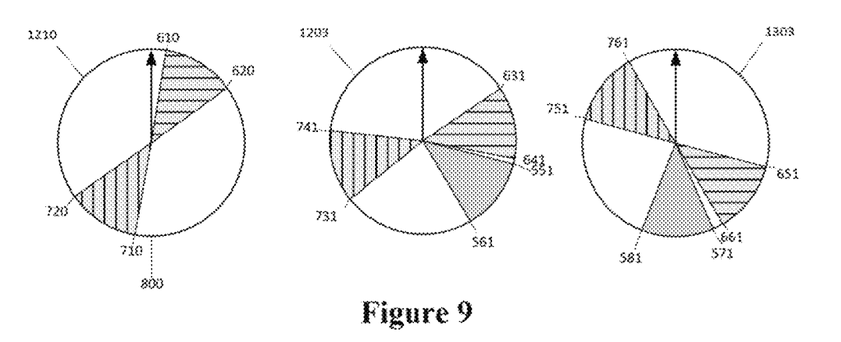

The modifications in the transmission cycles contained in K allow a new placement of the transmissions for the new flow. As a result, FIG. 9 shows the modified transmission cycles (respectively 1203, 1303) where the transmissions of $F_{600}$ are scheduled, now within the maximum required end-to-end delay.

REFERENCES

[1] SAE Standard AS6802, 2011. URL: http://standards.sae.org/as6802
[2] IEEE 802.3-2012—IEEE Standard for Ethernet, https://standards.ieee.org/about/get/802/802.3.html
[3] 802.1AS-2011—IEEE Standard for Local and Metropolitan Area Networks—Timing and Synchronization for Time-Sensitive Applications in Bridged Local Area Networks

[4] R. N. et al. Steiner tree based distributed multicast routing in networks. In X. Cheng and D.-Z. Du, editors, Steiner Trees in Industry. Springer, 2002
[5] Wilfried Steiner, Gunther Bauer, Brendan Hall, and Michael Paulitsch. TTEthernet: Time-Triggered Ethernet, 2011.
[6] ARINC Report 664P7-1. Aircraft Data Network, Part 7: Avionics Full Duplex Switched Ethernet (AFDX) Network, September 2009.
[7] IEEE Standard for Local Metropolitan Area Networks—Virtual Bridged Local Area Networks—Amendment: Forwarding and Queuing Enhancements for Time-Sensitive Streams, http://www.ieee802.org/1/pages/802.1av.html

The invention claimed is:

1. A method for transmitting messages in a time-triggered computer network, the computer network comprising as network components at least one star coupler and nodes, the network components being connected in a multi-hop fashion, wherein nodes in the computer network periodically exchange time-triggered (TT) messages according to a pre-defined transmission schedule, and wherein the nodes exchange, according to the transmission schedule, messages via scheduled time-triggered flows, wherein a time-triggered flow specifies at least the following information:
   sender node and a destination node;
   a multi-hop path between the sender node and the destination node;
   message size; and
   message period;
wherein:
   the transmission of messages at each node and star coupler is driven by the transmission schedule executed cyclically;
   the transmission schedule is decomposed into sub-schedules for each transmitting port of each network component;
   each sub-schedule is executed locally by the corresponding network component according to a transmission cycle;
   each transmission cycle has a duration which is a multiple of the period time of all transmitted flows by the port of the network component;
   the transmission cycle of each hop in the flow path is chosen such that a scheduled interval, the "transmission window", for the transmission of each flow is guaranteed;
   the length of the transmission window is sufficient to account for the transmission time of the message;
   the transmission windows for a given flow along the flow path are sequenced in time such that the transmission of the flow on a given port is scheduled after the transmission of the previous port; and
   transmission windows of different flows do not overlap in time on a given transmission port, and
wherein, for adding a new time-triggered flow into the computer network, the method comprises:
   (I) determining, for each hop in the new flow path of the new time-triggered flow, a free transmission gap in the transmission cycle of the corresponding port, wherein the transmission gap has to be sufficiently long to place a transmission window for the new time-triggered flow;
   (II) modifying, in case that a sufficiently long transmission gap is not free in the transmission cycle, the transmission cycle, by modifying, in particular shifting, at least one existing transmission window in the transmission cycle, wherein
   (III) modifying transmission cycles takes place iteratively, wherein
      (a) initially, only transmission cycles being part of the flow path are in a set of known transmission cycles considered for modification;
      (b) shifting one or more transmission windows of flows that are already being transmitted according to the pre-defined transmission schedule and corresponding to the set of known transmission cycles considered for modification until a sufficiently large transmission gap is available in the transmission cycle or all shifting possibilities have been exhausted;
      (c) if for a given transmission cycle, the previous steps (III)(a) and (III)(b) do not render a sufficiently large transmission gap in the transmission cycle to place the transmission window of the new time-triggered flow, the set of known transmission cycles being considered for modification is extended; and
      (d) steps (b) and (c) being repeated until a sufficient gap is found, the cumulated knowledge is equal to the entire network, or a predefined time out has been reached, and
   (IV) if a sufficient transmission gap is found in each transmission cycle along the flow path, the new time-triggered flow is incorporated into each of the transmission cycles and is executed periodically.

2. The method of claim 1, wherein step (II) is carried out with the following restriction(s):
   (a) an existing transmission window can be shifted within this transmission cycle within the limits imposed by the end of the predecessor transmission window and the beginning successor transmission window(s) in the respective transmission cycles; and/or
   (b) the transmission windows of the first and last hops cannot be shifted.

3. The method of claim 1, wherein according to step (III)(b) it is further provided that:
   (i) if the preceding transmission window of the transmission window in question is known, then the transmission window in question can be advanced at most until the end of the predecessor transmission window; and
   (ii) if the succeeding transmission window(s) is(are) known, then a transmission window in question can be delayed at most until the beginning of that succeeding window or, in the case of two or more succeeding transmission windows, until the beginning of the earliest succeeding transmission window.

4. The method of claim 1, wherein in step (III)(c):
   (i) the extension is limited to a defined subset of all remaining transmission cycles in the network; and/or
   (ii) the extension is directed to a defined subset of remaining nodes in the network.

5. The method of claim 1, wherein the length of a transmission window is sufficient to account for the transmission time of the flow.

6. The method of claim 1, wherein the duration of a transmission cycle is the least common multiple (LCM) of all flows in the network.

7. The method of claim 1, wherein a flow further specifies the maximum amount of data transmitted at each period interval and/or an end-to-end maximum latency.

8. The method of claim 1, wherein the steps for adding a new time-triggered flow into the computer network are carried out during run-time of the network.

9. The method of claim 1, wherein the steps for adding a new time-triggered flow are carried out by:
(i) an external component; or
(ii) one network component of the computer network; or
(iii) a subset of the nodes and/or starcouplers of the network or of all of the nodes and starcouplers of the network.

10. A time triggered computer network comprising:
network components comprising at least one star coupler and nodes, which network components are connected in a multi-hop fashion, wherein the nodes in the computer network periodically exchange time-triggered (TT) messages according to a pre-defined transmission schedule, and wherein the nodes exchange, according to the transmission schedule, messages via scheduled time-triggered flows, wherein a time-triggered flow specifies at least the following information:
sender node and destination node;
a multi-hop path between the sender node and the destination node;
message size;
message period;
wherein:
the transmission of messages at each node and star coupler is driven by the transmission schedule executed cyclically;
the transmission schedule is decomposed into sub-schedules for each transmitting port of each network component,
each sub-schedule is executed locally by the corresponding network component according to a transmission cycle,
each transmission cycle has a duration which is a multiple of the period time of all transmitted flows by the port of the network component,
the transmission cycle of each hop in the flow path is chosen such that a scheduled interval, the "transmission window", for the transmission of each flow is guaranteed,
the length of the transmission window is sufficient to account for the transmission time of the message,
the transmission windows for a given flow along the flow path are sequenced in time such that the transmission of the flow on a given port is scheduled after the transmission of the previous port, and
transmission windows of different flows do not overlap in time on a given transmission port,
wherein the computer network further comprises means, is operably connected to means, or is configured to be operably connected to means, for adding a new time-triggered flow into the computer network, which means are adapted to carry out the following steps:
(I) determining, for each hop in the new flow path of the new time-triggered flow, a free transmission gap in the transmission cycle of the corresponding port, wherein the transmission gap has to be sufficiently long to place a transmission window for the new time-triggered flow;
(II) modifying, in case that a sufficiently long transmission gap is not free in the transmission cycle, the transmission cycle by modifying, in particular shifting, at least one existing transmission window in the transmission cycle, wherein
(III) modifying transmission cycles takes place iteratively, wherein
(a) initially, only transmission cycles being part of the flow path are in a set of known transmission cycles considered for modification;
(b) shifting one or more transmission windows of flows that are already being transmitted to the pre-defined transmission schedule and corresponding to the set of known transmission cycles considered for modification until a sufficiently large transmission gap is available in the transmission cycle or all shifting possibilities have been exhausted;
(c) if for a given transmission cycle, the previous steps (III)(a) and (III)(b) do not render a sufficiently large transmission gap in the transmission cycle to place the transmission window of the new time-triggered flow, the set of known transmission cycles being considered for modification is extended;
(d) steps (b) and (c) being repeated until a sufficient gap is found, the cumulated knowledge is equal to the entire network, or a predefined time out has been reached,
(IV) if a sufficient transmission gap is found in each transmission cycle along the flow path, the new time-triggered flow is incorporated into each of the transmission cycles and is executed periodically.

11. The computer network of claim 10, wherein step (II) is carried out with the following restriction(s):
(a) an existing transmission window can be shifted within this transmission cycle within the limits imposed by the end of the predecessor transmission window and the beginning successor transmission window(s) in the respective transmission cycles; and/or
(b) the transmission windows of the first and last hops cannot be shifted.

12. The computer network of claim 10, wherein according to step (III)(b) it is further provided that:
(i) if the preceding transmission window of the transmission window in question is known, then the transmission window in question can be advanced at most until the end of the predecessor transmission window; and
(ii) if the succeeding transmission window(s) is (are) known, then a transmission window in question can be delayed at most until the beginning of that succeeding window or, in the case of two or more succeeding transmission windows, until the beginning of the earliest succeeding transmission window.

13. The computer network of claim 10, wherein in step (III)(c):
(i) the extension is limited to a defined subset of all remaining transmission cycles in the network; and/or
(ii) the extension may be directed to a defined subset of remaining nodes in the network.

14. The computer network of claim 10, wherein the length of a transmission window is sufficient to account for the transmission time of the flow.

15. The computer network of claim 10, wherein the duration of a transmission cycle is the least common multiple (LCM) of all flows in the network.

16. The computer network of claim 10, wherein a flow further specifies the maximum amount of data transmitted at each period interval and/or an end-to-end maximum latency.

17. The computer network of claim 10, wherein the steps for adding a new time-triggered flow into the computer network are carried out during run-time of the network.

18. The computer network of claim 10, wherein the means for carrying out the steps for adding a new time-triggered flow are or comprise:
  (i) an external component; or
  (ii) one network component of the computer network; or
  (iii) a subset of the nodes and/or starcouplers of the network or of all of the nodes and starcouplers of the network.

* * * * *